United States Patent [19]

Schündehütte et al.

[11] Patent Number: 4,460,505
[45] Date of Patent: Jul. 17, 1984

[54] DYESTUFFS, PROCESSES FOR THEIR PREPARATION AND THEIR USE FOR DYEING MATERIALS CONTAINING HYDROXYL GROUPS OR NITROGEN

[75] Inventors: Karl H. Schündehütte, Leverkusen; Hermann Henk, Cologne, both of Fed. Rep. of Germany

[73] Assignee: Bayer Aktiengesellschaft, Leverkusen, Fed. Rep. of Germany

[21] Appl. No.: 240,638

[22] Filed: Mar. 5, 1981

[30] Foreign Application Priority Data

Mar. 17, 1980 [DE] Fed. Rep. of Germany ....... 3010161

[51] Int. Cl.³ .................. C09B 31/02; C09B 31/04; C09B 31/14
[52] U.S. Cl. ................................... 260/153; 260/154
[58] Field of Search ............................. 260/153, 154

[56] References Cited

U.S. PATENT DOCUMENTS 3,822,263  7/1974  Bien et al. .................. 260/256.5 R
4,242,259 12/1980  Harms et al. ..................... 260/153
4,261,889  4/1981  Seirer et al. ..................... 260/153

Primary Examiner—Paul F. Shaver
Attorney, Agent, or Firm—Sprung, Horn, Kramer & Woods

[57] ABSTRACT

The invention relates to new dyestuffs of the general formula

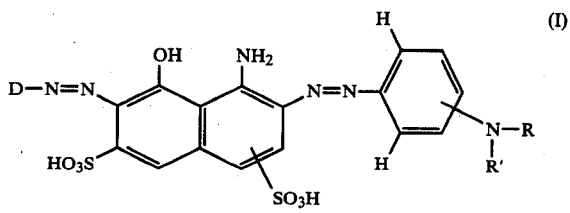

wherein the radicals D, R and R' have the meaning given in the text of the application, processes for their preparation and their use for dyeing materials containing hydroxyl groups or nitrogen.

3 Claims, No Drawings

DYESTUFFS, PROCESSES FOR THEIR PREPARATION AND THEIR USE FOR DYEING MATERIALS CONTAINING HYDROXYL GROUPS OR NITROGEN

The invention relates to new dyestuffs of the general formula (I)

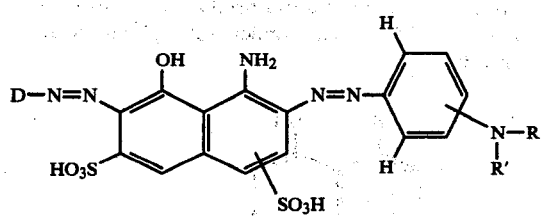

wherein
D represents an optionally substituted phenyl or naphthyl radical,
R represents the radical of a fibre-reactive fluoro-heterocyclic radical which is optionally substituted by other radicals and
R' represents hydrogen or $C_1$–$C_4$-alkyl.
Dyestuffs of the general formula (II)

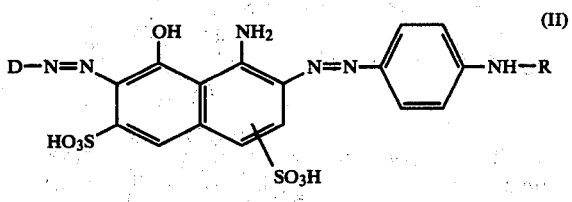

wherein
D and R have the abovementioned meaning, are preferred.
Dyestuffs of the general formula (III)

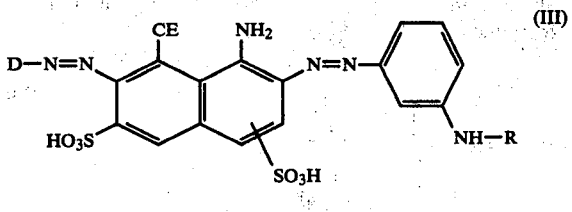

wherein
D and R have the abovementioned meaning, are also preferred.

If D is a phenyl radical, it can be further substituted, for example by one to two sulpho groups, aminosulphonyl, carboxyl, aminocarbonyl, $C_1$–$C_4$-alkoxycarbonyl, $C_1$–$C_4$-alkyl, $C_1$–$C_4$-alkoxy, halogen—in particular chlorine, $C_1$–$C_4$-alkylcarbonylamino, benzoylamino or optionally substituted phenyl, phenylazo, naphthylazo or 2-benzothiazolyl groups. Preferred possible substituents on the phenyl, phenylazo, naphthylazo and 2-benzothiazolyl groups mentioned last are: halogen, in particular chlorine, and $SO_3H$, COOH, OH, $C_1$–$C_4$-alkyl and $C_1$–$C_4$-alkoxy.

Naphthalene radicals D can carry the azo bridge in the 1-position or 2-position and are preferably substituted by $C_1$–$C_4$-alkoxy, hydroxyl or one to three sulpho groups.

Suitable radicals R are, in particular, 5-membered or 6-membered heterocyclic radicals with one or more nitrogen atoms and optionally fused-on 5-membered or 6-membered carbocyclic rings, as well as at least one fluorine atom which can be split off under dyeing conditions.

Examples which may be mentioned are: pyridine, pyrimidine, triazine, quinoline and phenanthridine radicals.

Suitable radicals of this type are described, for example, in British Patent Specifications Nos. 1,526,840, 1,169,254 and 1,188,606.

Specific radicals which may be mentioned are: 2-amino-4-fluoro-6-triazinyl, 2-methylamino-4-fluoro-6-triazinyl, 2-ethylamino-4-fluoro-6-triazinyl, 2-isopropylamino-4-fluoro-6-triazinyl, 2-dimethylamino-4-fluoro-6-triazinyl, 2-diethylamino-4-fluoro-6-triazinyl, 2-β-methoxy-ethylamino-4-fluoro-6-triazinyl, 2-β-hydroxyethylamino-4-fluoro-6-triazinyl, 2-di-(β-hydroxyethylamino)-4-fluoro-6-triazinyl, 2-β-sulphoethylamino-4-fluoro-6-triazinyl, 2-β-sulphoethyl-methylamino-4-fluoro-6-triazinyl, 2-β-carboxymethylamino-4-fluoro-6-triazinyl, 2-β-cyanoethylamino-4-fluoro-6-triazinyl, 2-benzylamino-4-fluoro-6-triazinyl, 2-β-phenylethylamino-4-fluoro-6-triazinyl, 2-benzyl-methylamino-4-fluoro-6-triazinyl, 2-(x-sulpho-benzyl)-amino-4-fluoro-6-triazinyl, 2-cyclohexylamino-4-fluoro-6-triazinyl, 2-(o-, m- or p-methylphenyl)-amino-4-fluoro-6-triazinyl, 2-(o-, m- or p-sulphophenyl)-amino-4-fluoro-6-triazinyl, 2-(2',5'-disulphophenyl)-amino-4-fluoro-6-triazinyl, 2-(o-, m- or p-chlorophenyl)-amino-4-fluoro-6-triazinyl, 2-(o-, m- or p-methoxyphenyl)-4-fluoro-6-triazinyl, 2-(2'-methyl-4'-sulphophenyl)-amino-4-fluoro-6-triazinyl, 2-(2'-methyl-5'-sulphophenyl)-amino-4-fluoro-6-triazinyl, 2-(2'-chloro-4'-sulphophenyl)-amino-4-fluoro-6-triazinyl, 2-(2'-chloro-5'-sulphophenyl)-amino-4-fluoro-6-triazinyl, 2-(2'-methoxy-4'-sulphophenyl)-amino-4-fluoro-6-triazinyl, 2-(o-, m- or p-carboxyphenyl)-amino-4-fluoro-6-triazinyl, 2-(2',4'-disulphophenyl)-amino-4-fluoro-6-triazinyl, 2-(3',5'-disulphophenyl)-amino-4-fluoro-6-triazinyl, 2-(2'-carboxy-4-sulphophenyl)-amino-4-fluoro-6-triazinyl, 2-(6'-sulphonaphth-2'-yl)-amino-4-fluoro-6-triazinyl, 2-(4',8'-disulphonaphth-2'-yl)-amino-4-fluoro-6-triazinyl, 2-(6',8'-disulphonaphth-2'-yl)-amino-4-fluoro-6-triazinyl, 2-(N-methylphenyl)-amino-4-fluoro-6-triazinyl, 2-(N-ethylphenyl)-amino-4-fluoro-6-triazinyl, 2-(N-β-hydroxyethylphenyl)-amino-4-fluoro-6-triazinyl, 2-(N-iso-propylphenyl)-amino-4-fluoro-6-triazinyl, 2-morpholino-4-fluoro-6-triazinyl, 2-piperidino-4-fluoro-6-triazinyl, 2-(4',6',8'-trisulphonaphth-2'-yl)-fluoro-6-triazinyl, 2-(3',6',8'-trisulphonaphth-2'-yl)-4-fluoro-6-triazinyl, 2-(3',6'-disulphonaphth-1'-yl)-4-fluoro-6-triazinyl, 2-fluoro-4-pyridinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrmidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoro-methyl-4-pyrimidinyl, 2-fluoro-5-phenyl- or -5-methyl-sulphonyl-4-pyrimidinyl, 2-fluoro-4-carboxamide-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoro-methyl-4-pyrimidinyl.

Dyestuffs of the formulae (I) to (III) in which R denotes (IV), (V), (VI) or (VII)

are preferred.

Suitable substituents $R_1$ are, for example, amino groups such as $$-N\begin{matrix}R_2\\R_3\end{matrix},$$

or groups of the formula $-OR_4$ or $-SR_4$, wherein $R_2$ and $R_3$ independently of one another denote hydrogen, amino, $C_1$–$C_4$-alkyl, aryl, aralkyl or cycloalkyl, or together, optionally with the inclusion of one or more hetero-atoms, in particular oxygen and/or nitrogen, form a ring (in particular a 5-membered or 6-membered ring), and $R_4$ represents hydrogen, $C_1$–$C_4$-alkyl, aryl or aralkyl.

The alkyl, aryl or aralkyl radicals $R_2$, $R_3$ and $R_4$ can carry the substituents customary in dyestuff chemistry, such as, for example, $SO_3H$, $OH$, $NH_2$, $C_1$–$C_4$-alkoxy, $COOH$ or halogen (in particular Cl).

The alkyl radicals $R_2$, $R_3$ and $R_4$ preferably have 1 to 4 carbon atoms. The aryl radicals $R_2$, $R_3$ and $R_4$ are preferably phenyl or naphthyl, and aralkyl $R_2$, $R_3$ and $R_4$ is preferably $C_1$–$C_4$-alkyl which is substituted by phenyl or naphthyl.

The invention also relates to a process for the preparation of dyestuffs of the formula (I).

The compounds of the formula (I) are prepared, for example, as follows:

A nitroaniline of the formula (VIII)

is diazotised, the diazotisation product is coupled with an 8-amino-1-hydroxy-naphthalene-disulphonic acid of the formula (IX)

in an acid medium, to give a compound of the formula (X)

and this azo compound is coupled with a diazonium compound, prepared from $D-NH_2$, of the formula $$D-N\equiv\overset{\oplus}{N} \quad X^\ominus \quad (XI)$$

wherein $X^\ominus$ denotes an anionic radical, in a neutral to alkaline medium, to give a bis-azo compound of the formula (XII)

the nitro group of this compound is reduced to the amino group and the compound thereby formed, of the formula (XIII)

is reacted with a heterocyclic compound which is substituted by at least two fluorine atoms and is optionally substituted by other radicals.

The dyestuffs according to the invention are prepared, in particular, by diazotising 3- or 4-nitroaniline and coupling the diazotisation product to 8-amino-1-hydroxynaphthalene-3,5- or -3,6-disulphonic acid in an acid medium, diazotising a compound D—NH$_2$ and coupling the diazotisation product with the above coupling product in a neutral to alkaline medium, reducing the nitro group and then subjecting the product to a condensation reaction with 2,4,6-trifluoro-5-chloropyrimidine, 2,4-difluoro-5-chloropyrimidine, 2,4-difluoro-5-chloro-6-methylpyrimidine or 2,4,6-trifluoro-1,3,5-triazine and an optionally substituted amino, hydroxy or mercapto compound in any desired sequence to give dyestuffs of the general formula (I).

Examples of diazotisable amines D—NH$_2$ which may be mentioned are: 1-aminobenzene, 1-aminobenzene-2-, -3- or -4-sulphonic acid, 1-aminobenzene-2,4-, -2,5- or -3,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-amino-4-methylbenzene-3-sulphonic acid, 1-amino-2-methylbenzene-3-sulphonic acid, 1-amino-2,4-dimethylbenzene-6-sulphonic acid, 1-amino-4- or -5-chlorobenzene-2-sulphonic acid, 1-amino-6-chlorobenzene-3- or -4-sulphonic acid, 1-amino-4-chlorobenzene-3-sulphonic acid, 1-amino-2,4-dichlorobenzene-6-sulphonic acid, 1-amino-2,5-dichlorobenzene-4-sulphonic acid, 1-amino-5-methyl-4-chlorobenzene-2-sulphonic acid, 1-amino-2-methyl-4-chlorobenzene-2-sulphonic acid, 1-amino-2-methyl-6-chlorobenzene-4-sulphonic acid, 1-amino-4- or -5-methoxybenzene-2-sulphonic acid, 1-amino-6-methoxybenzene-3- or -4-sulphonic acid, 1-amino-6-ethoxybenzene-3- or -4-sulphonic acid, 1-amino-2,4-dimethoxybenzene-6-sulphonic acid, 1-amino-2,5-dimethoxybenzene-4-sulphonic acid, 1-amino-3-acetylaminobenzene-6-sulphonic acid, 1-amino-4-acetylaminobenzene-2-sulphonic acid, 1-amino-3-acetylamino-4-methylbenzene-6-sulphonic acid, 1-amino-4-methoxybenzene-2,5-disulphonic acid, 1-amino-4-methyl-2,5-disulphonic acid, 1-amino-2-carboxy-4- or -5-sulphonic acid, 1-aminonaphthalene-2-, -3-, -4-, -5-, -6-, -7- or -8-sulphonic acid, 2-aminonaphthalene-1-, -5-, -6-, -7- or -8-sulphonic acid, 1-aminonaphthalene-2,4-, -3,6-, -3,7-, -3,8-, -4,6-, -4,7-, -4,8-, -5,7- or -6,8-disulphonic acid, 2-aminonaphthalene-1,5-, -3,6-, -3,7-, -4,8-, -5,7- or -6,8-disulphonic acid, 1-aminonaphthalene-2,4,6-, -2,4,7-, -3,6,8- or -4,6,8-trisulphonic acid, 2-aminonaphthalene-1,5,7-, -3,6,8- or -4,6,8-trisulphonic acid, 2-(4-aminophenyl)-6-methylbenzothiazole-sulphonic acid, 2-(4-amino-3-sulphophenyl)-6-methyl-7-benzothiazole-sulphonic acid, 4-aminoazobenzene, 4-aminoazobenzene-4'-sulphonic acid and 4-aminoazobenzene-3,4'-disulphonic acid.

The dyestuffs and dyestuff intermediate products according to the invention are preferably prepared in an aqueous medium.

Reduction of the nitro groups is carried out by processes which are known from the literature, for example by catalytic hydrogenation, electrolytic reduction or reaction with suitable reducing agents; see, for example, R. Schröter in Houben-Weyl, Volume XI/1, pages 360–515 (1957).

The reaction with fluorine-containing heterocyclic compounds is carried out at a weakly acid to weakly alkaline pH value. The hydrofluoric acid liberated during the condensation reaction is neutralised by adding dilute alkali metal hydroxide, carbonate or bicarbonate solution.

Finally, the invention relates to the use of dyestuffs of the formula (I) for dyeing materials containing hydroxyl groups and/or nitrogen.

The dyestuffs according to the invention are particularly suitable for dyeing and printing wool, and in particular polyamide and leather, viscose staple and regenerated cellulose, but above all cotton.

The formulae given are those of the free acids. The dyestuffs are generally used in the form of their salts. Particularly suitable salts are the alkali metal salts (Li, Na or K) or ammonium salts.

EXAMPLE 1

60.5 parts of 4-nitroaniline are stirred into 1,000 parts of water and 140 parts of 30% strength hydrochloric acid, and 100 parts of 30% strength nitrite solution are added at about 10° C. The diazo solution thus obtained is added to a suspension of 167 parts of 8-amino-1-hydroxynaphthalene-3,6-disulphonic acid in 1,000 parts of water of about 10° C. The 1st coupling reaction has ended after about 10 hours.

171.7 parts of 1-aminobenzene-2,5-disulphonic acid are dissolved, under neutral conditions, in 300 parts of water containing sodium hydroxide solution, the solution is cooled to 0°–5° C. with ice and 140 parts of 30% strength hydrochloric acid and then 110 parts of 30% strength nitrite solution are added. The diazo suspension thus obtained is added to the mixture from the 1st coupling reaction and the pH value is slowly adjusted to 9 with 280 parts of 40% strength sodium hydroxide solution. The 2nd coupling reaction ends rapidly.

About 80 parts of technical grade sodium sulphide are added to this dyestuff solution. The reduction is slightly exothermic and ends rapidly.

In order to precipitate the aminodisazo dyestuff, 250 parts of 30% strength hydrochloric acid and 20% by weight of sodium chloride are added.

The dyestuff paste which can be obtained in this manner is dissolved in 1,000 parts of hot water with sodium carbonate, the solution is filtered hot and 52 parts by volume of 2,4-difluoro-5-chloro-6-methylpyrimidine are then added to the filtrate. The pH value is kept in the range from 5 to 7 with 70 parts by volume of 20% strength sodium carbonate solution until the condensation reaction has ended. When the reaction, which can easily be followed by chromatography, has ended, the dyestuff is isolated by adding sodium chloride. After drying and grinding, a dark dyestuff powder, which dyes cotton in a fast greenish-tinged black colour shade from an aqueous liquor, is obtained.

In the form of the free acid, the dyestuff corresponds to the formula:

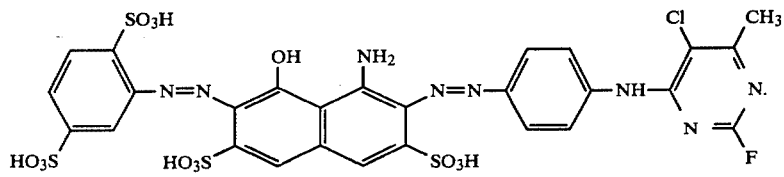

EXAMPLES 2 TO 15

If the 1-aminobenzene-2,5-disulphonic acid in Example 1 is replaced by the diazo components given in Table 1, column I and the procedure followed is as according to the statements in Example 1, other valuable dyestuffs (for these, see Table 2), which dye cotton in a fast black colour shade, are obtained.

EXAMPLES 16 TO 24

If the 2,4-difluoro-5-chloro-6-methyl-pyrimidine in Example 1 is replaced by equivalent amounts of the fluorine-containing heterocyclic compounds given in Table 1, column II, fast black reactive dyestuffs for cotton are likewise obtained (for these, see Table 3).

EXAMPLES 25 TO 48

If the 4-nitroaniline in Examples 1 to 24 is replaced by the equivalent amount of 3-nitroaniline, valuable dyestuffs, which dye cotton in fast black shades, are likewise obtained (for these, see Tables 4 and 5).

EXAMPLES 49 TO 96

If the 8-amino-1-hydroxynaphthalene-3,6-disulphonic acid in Examples 1 to 49 is replaced by the equivalent amount of 8-amino-1-hydroxynaphthalene-3,5-disulphonic acid, further fast black reactive dyestuffs are obtained (for these, see Tables 6 to 9).

TABLE 1

| Column I<br>Diazotised amines D—$NH_2$ | Starting component for Examples | Column II<br>Fluorine-substituted heterocyclic compound | Starting component for Examples |
|---|---|---|---|
| ⌬—$NH_2$ | 2,26,50,74 | (Cl, F, H pyrimidine with F) | 16,40,64,88 |
| $HO_3S$—⌬—$NH_2$ | 3,27,51,75 | | |
| ⌬—$NH_2$ (m-$SO_3H$) | 4,28,52,76 | (Cl, F, F pyrimidine with F) | 17,41,65,89 |
| ⌬—$NH_2$ (o-$SO_3H$) | 5,29,53,77 | (triazine with F and NH-C₆H₄-$SO_3H$) | 18,42,66,90 |
| $HO_3S$—⌬—$NH_2$ (o-$SO_3H$) | 6,30,54,78 | | |
| naphthyl-$NH_2$ (1-$SO_3H$, 2-$NH_2$) | 7,31,55,79 | (triazine with F and N($CH_3$)—$CH_2$—$CH_2$—$SO_3H$) | 19,43,67,91 |

TABLE 1-continued

| Column I Diazotised amines D—NH₂ | Starting component for Examples | Column II Fluorine-substituted heterocyclic compound | Starting component for Examples |
|---|---|---|---|
| 2-amino-1,5-naphthalenedisulfonic acid (SO₃H at 1, NH₂ at 2, HO₃S at 5) | 8,32,56,80 | F-triazine-NH-CH₂-CH₂-OH (4,6-difluoro-1,3,5-triazin-2-yl with NH-CH₂CH₂OH) | 20,44,68,92 |
| 6-amino-2-naphthalenesulfonic acid (HO₃S—naphthalene—NH₂) | 9,33,57,81 | 4,6-difluoro-1,3,5-triazin-2-amine (F,N,NH₂,N,N,F) | 21,45,69,93 |
| 3-amino-1,5-naphthalenedisulfonic acid (SO₃H, NH₂, SO₃H) | 10,34,58,82 | 4,6-difluoro-2-methoxy-1,3,5-triazine (F,N,OCH₃,N,N,F) | 22,46,70,94 |
| 4-amino-1-naphthalenesulfonic acid (NH₂, SO₃H) | 11,35,59,83 | 4,6-difluoro-2-methylthio-1,3,5-triazine (F,N,SCH₃,N,N,F) | 23,47,71,95 |
| 2-(4-aminophenyl)-6-methylbenzothiazole-x-sulfonic acid (CH₃, HO₃S, S, N, —NH₂) | 12,36,60,84 | 4,6-difluoro-N-(2-hydroxyethyl)-N-phenyl-1,3,5-triazin-2-amine (F,N,N(C₂H₄OH)(phenyl),N,N,F) | 24,48,72,96 |
| 2-(4-amino-3-sulfophenyl)-6-methyl-7-sulfobenzothiazole (CH₃, SO₃H, S, SO₃H, N, NH₂) | 13,37,61,85 | | |
| 4-amino-4'-sulfoazobenzene (HO₃S—C₆H₄—N=N—C₆H₄—NH₂) | 14,38,62,86 | | |
| 4-amino-4'-sulfo-3-sulfoazobenzene (HO₃S—C₆H₄—N=N—C₆H₃(SO₃H)—NH₂) | 15,39,63,87 | | |

TABLE 2

Dyestuffs of the general formula

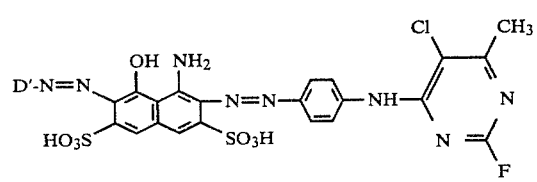

(XIV)

| Example | D' | Colour |
|---|---|---|
| 2 | phenyl | black |
| 3 | 4-sulfophenyl | black |
| 4 | 3-sulfophenyl | black |
| 5 | 2-sulfophenyl | black |
| 6 | 2,5-disulfo-4-methylphenyl | black |
| 7 | 2-sulfonaphth-6-yl | black |
| 8 | 1,5-disulfonaphth-7-yl (approx.) | black |
| 9 | 6-sulfonaphth-2-yl | black |
| 10 | 1,5-disulfonaphth-3-yl | black |

TABLE 2-continued

Dyestuffs of the general formula

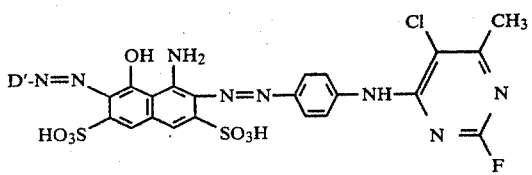

(XIV)

| Example | D' | Colour |
|---|---|---|
| 11 | 4-sulfonaphth-1-yl | black |
| 12 | 6-methyl-sulfo-2-phenylbenzothiazolyl | black |
| 13 | 6-methyl-7-sulfo-benzothiazol-2-yl (4-methyl-3-sulfophenyl) | black |
| 14 | 4'-sulfo-azobenzene-4-yl | black |
| 15 | (4-sulfophenylazo)-2-sulfo-4-methylphenyl | black |

TABLE 3

Dyestuffs of the general formula

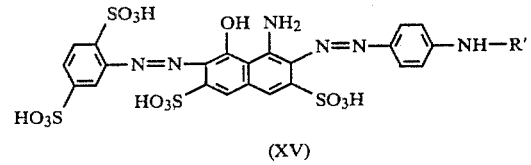

(XV)

| Example | R' | Colour |
|---|---|---|
| 16 | | black |
| 17 | | black |

TABLE 3-continued

Dyestuffs of the general formula

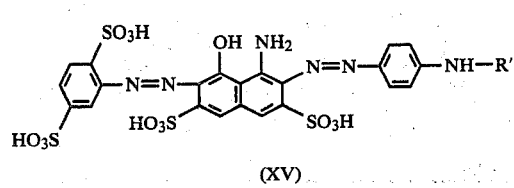

(XV)

| Example | R' | Colour |
|---|---|---|
| 18 | (triazine with F, =N-, connected to NH-C6H4-SO3H) | black |
| 19 | (triazine with F, =N-, connected to N(CH3)-CH2-CH2-SO3H) | black |
| 20 | (triazine with F, =N-, connected to NH-CH2-CH2OH) | black |
| 21 | (triazine with F, =N-, connected to NH2) | black |
| 22 | (triazine with F, =N-, connected to OCH3) | black |
| 23 | (triazine with F, connected to SCH3) | black |
| 24 | (triazine with F, connected to N(C2H4OH)-C6H5) | black |

If the 2,5-disulphophenyl substituent in Examples 16–24 is replaced by the corresponding radicals of the amines listed in Table 1, column I, valuable dyestuffs are likewise obtained.

TABLE 4

Dyestuffs of the general formula

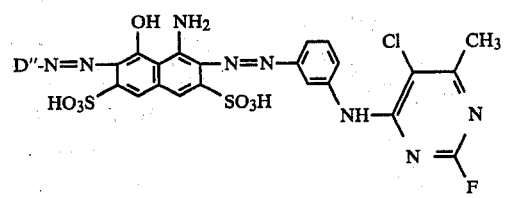

| Example | D'' | Colour |
|---|---|---|
| 25 | 2,4-disulphophenyl (SO3H top, HO3S bottom) | black |
| 26 | phenyl | black |
| 27 | 4-sulphophenyl (HO3S-) | black |
| 28 | 3-sulphophenyl | black |
| 29 | 2-sulphophenyl (SO3H) | black |
| 30 | 2,5-disulphophenyl | black |
| 31 | naphthyl-1-SO3H (2-position) | black |
| 32 | 6-sulphonaphthyl with SO3H | black |
| 33 | disulphonaphthyl | black |

TABLE 4-continued

Dyestuffs of the general formula

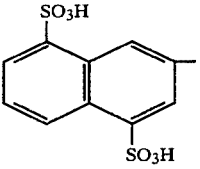

| Example | D'' | Colour |
|---|---|---|
| 34 | 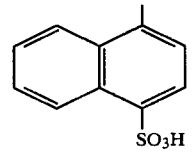 | black |
| 35 | 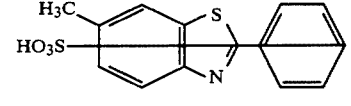 | black |
| 36 | 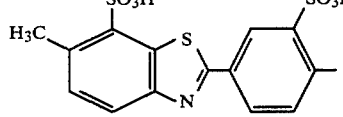 | black |
| 37 | 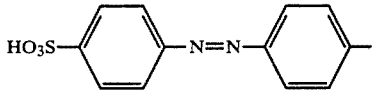 | black |
| 38 | 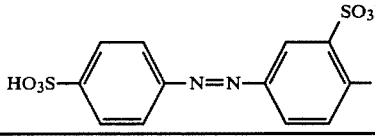 | black |
| 39 | 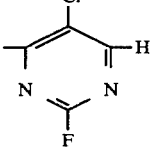 | black |

TABLE 5

Dyestuffs of the general formula

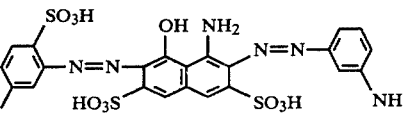 (XVII)

| Example | R'' | Colour |
|---|---|---|
| 40 | 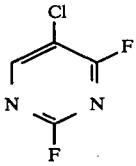 | black |
| 41 |  | black |
| 42 | 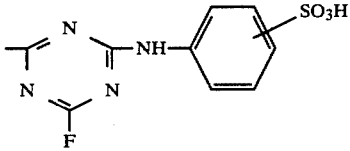 | black |
| 43 | 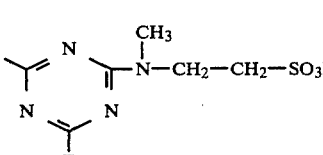 | black |
| 44 | 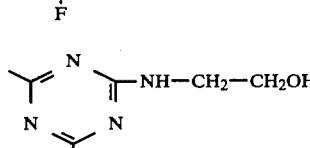 | black |
| 45 | 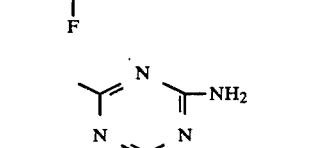 | black |
| 46 | 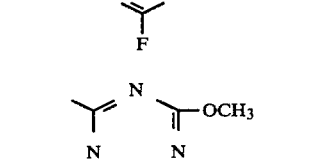 | black |
| 47 | 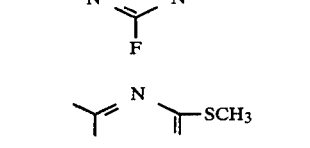 | black |
| 48 | 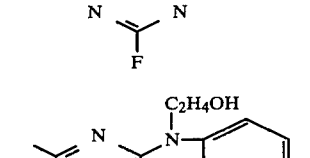 | black |

If the 2,5-disulphophenyl substituent in Examples 40 to 49 is replaced by the corresponding radicals of the amines listed in Table 1, column I, valuable dyestuffs are likewise obtained.

TABLE 6
Dyestuffs of the general formula
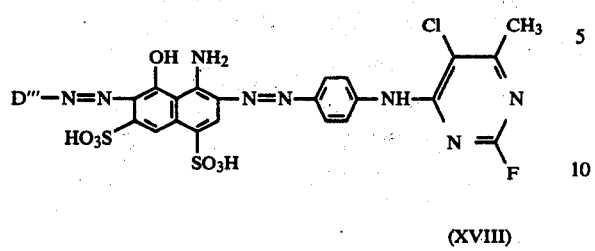
(XVIII)
| Example | D''' | Colour |
|---|---|---|
| 49 | 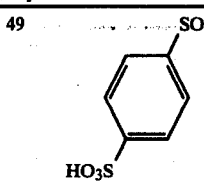 | black |
| 50 | 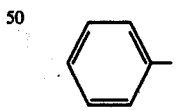 | black |
| 51 | 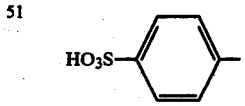 | black |
| 52 | 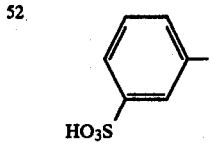 | black |
| 53 | 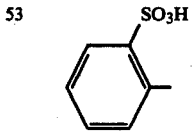 | black |
| 54 | 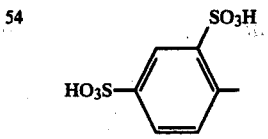 | black |
| 55 | 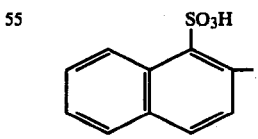 | black |
| 56 | 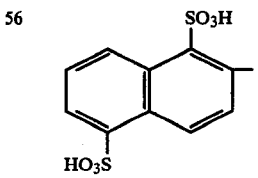 | black |
| 57 | 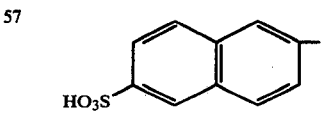 | black |
TABLE 6-continued
Dyestuffs of the general formula
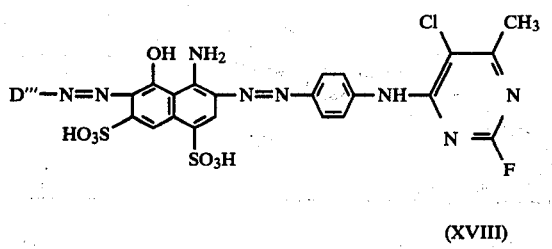
(XVIII)
| Example | D''' | Colour |
|---|---|---|
| 58 | 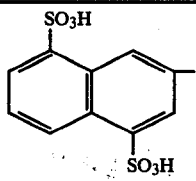 | black |
| 59 | 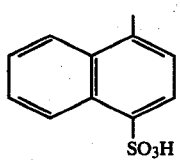 | black |
| 60 | 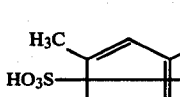 | black |
| 61 | 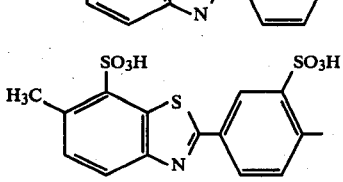 | black |
| 62 | 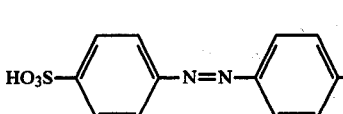 | black |
| 63 | 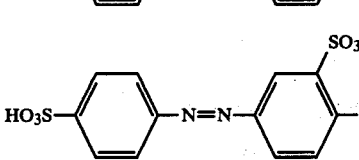 | black |
TABLE 7
Dyestuffs of the general formula
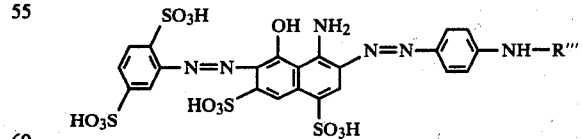
| Example | R''' | Colour |
|---|---|---|
| 64 |  | black |

TABLE 7-continued
Dyestuffs of the general formula

[Structure: naphthalene with SO₃H, OH, NH₂, HO₃S, SO₃H substituents, azo-linked to 2,5-disulphophenyl group and to phenyl-NH-R''']

| Example | R''' | Colour |
|---|---|---|
| 65 | [2-chloro-3-fluoro-pyrimidinyl group] | black |
| 66 | [fluoropyrimidinyl-NH-C₆H₄-SO₃H] | black |
| 67 | [fluoropyrimidinyl with N(CH₃)-CH₂-CH₂-SO₃H] | black |
| 68 | [fluoropyrimidinyl-NH-CH₂-CH₂OH] | black |
| 69 | [fluoropyrimidinyl-NH₂] | black |
| 70 | [fluoropyrimidinyl-OCH₃] | black |
| 71 | [fluoropyrimidinyl-SCH₃] | black |
| 72 | [fluoropyrimidinyl-N(C₂H₄OH)(phenyl)] | black |

If the 2,5-disulphophenyl substituent in Examples 64 to 72 is replaced by the corresponding radicals of the amines listed in Table 1, column I, valuable dyestuffs are likewise obtained.

TABLE 8
Dyestuffs of the general formula

[Structure (XX): D''''-N=N- naphthalene with OH, NH₂, HO₃S, SO₃H substituents, -N=N- phenyl-NH-(chloro-methyl-fluoro-pyrimidinyl) group]

(XX)

| Example | D'''' | Colour |
|---|---|---|
| 73 | [2,5-disulphophenyl: SO₃H, HO₃S] | black |
| 74 | [phenyl] | black |
| 75 | [4-sulphophenyl: HO₃S] | black |
| 76 | [3-sulphophenyl: HO₃S] | black |
| 77 | [2-sulphophenyl: SO₃H] | black |
| 78 | [2,5-disulphophenyl: SO₃H, HO₃S] | black |
| 79 | [naphthyl-SO₃H] | black |
| 80 | [naphthyl with SO₃H and HO₃S] | black |
| 81 | [naphthyl with HO₃S] | black |

TABLE 8-continued

Dyestuffs of the general formula

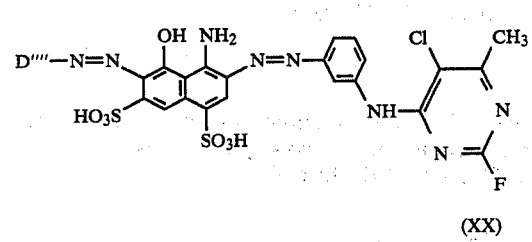

(XX)

| Example | D'''' | Colour |
|---|---|---|
| 82 | 1,5-naphthalenedisulfonic acid (SO₃H at 1 and 5) | black |
| 83 | 4-methylnaphthalene-1-sulfonic acid | black |
| 84 | 6-methyl-7-sulfo-2-phenylbenzothiazole | black |
| 85 | 6-methyl-7-sulfo-2-(4-methyl-3-sulfophenyl)benzothiazole | black |
| 86 | 4-sulfo-4'-methylazobenzene | black |
| 87 | 4-sulfo-4'-methyl-3'-sulfoazobenzene | black |

TABLE 9

Dyestuffs of the general formula

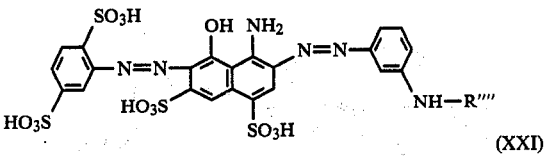

(XXI)

| Example | R'''' | Colour |
|---|---|---|
| 88 | 5-chloro-6-methyl-2-fluoropyrimidin-4-yl (H at 5-position shown) | black |
| 89 | 5-chloro-6-fluoro-2-fluoropyrimidin-4-yl | black |
| 90 | 4-(4-sulfophenylamino)-6-methyl-2-fluoro-1,3,5-triazin-... | black |
| 91 | 4-[N-methyl-N-(2-sulfoethyl)amino]-6-methyl-2-fluoro-1,3,5-triazinyl | black |
| 92 | 4-(2-hydroxyethylamino)-6-methyl-2-fluoro-1,3,5-triazinyl | black |
| 93 | 4-amino-6-methyl-2-fluoro-1,3,5-triazinyl | black |
| 94 | 4-methoxy-6-methyl-2-fluoro-1,3,5-triazinyl | black |
| 95 | 4-methylthio-6-methyl-2-fluoro-1,3,5-triazinyl | black |

TABLE 9-continued

Dyestuffs of the general formula

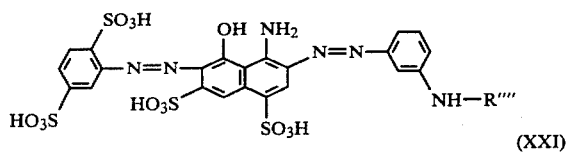

| Example | R'''' | Colour |
|---------|-------|--------|
| 96 | 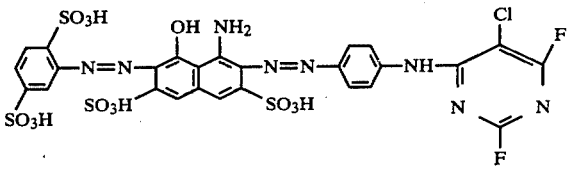 | black |

If the 2,5-disulphophenyl substituent in Examples 88–97 is replaced by the corresponding radicals of the amines listed in Table 1, column I, valuable dyestuffs are likewise obtained.

We claim:

1. Dyestuff having the formula

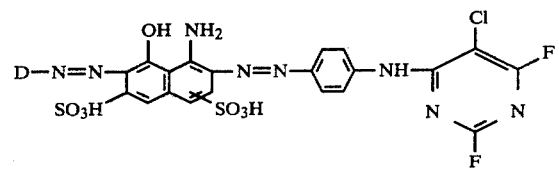

wherein D represents unsubstituted phenyl or phenyl substituted by one or two sulpho groups.

2. Dyestuff of the formula

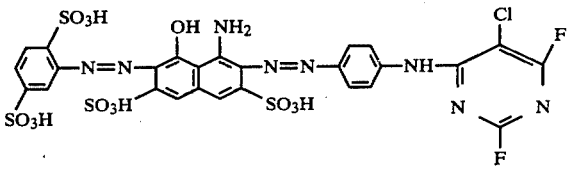

3. Dyestuff of the formula

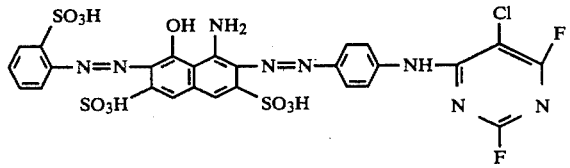

* * * * *